Figures 1, 2:
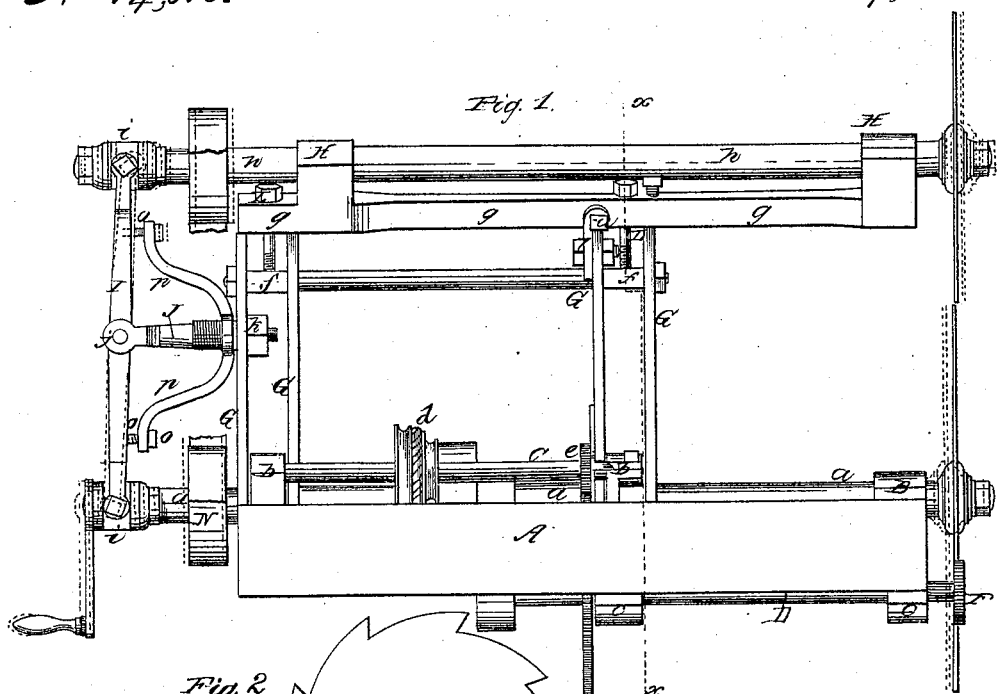

A. L. Whitley,
Circular Saw Mill.
Nº 14,379. Patented Mar. 4, 1856.

A. L. Whitley,
Circular Saw Mill.
N° 14,379. Patented Mar. 4, 1856.
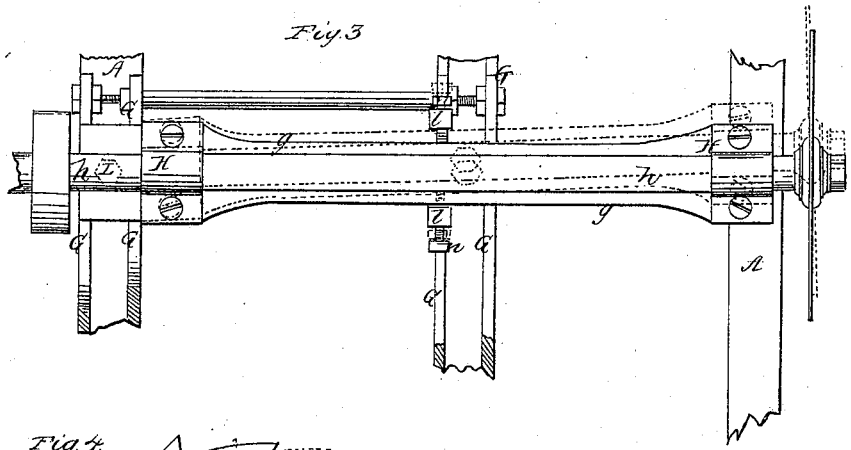
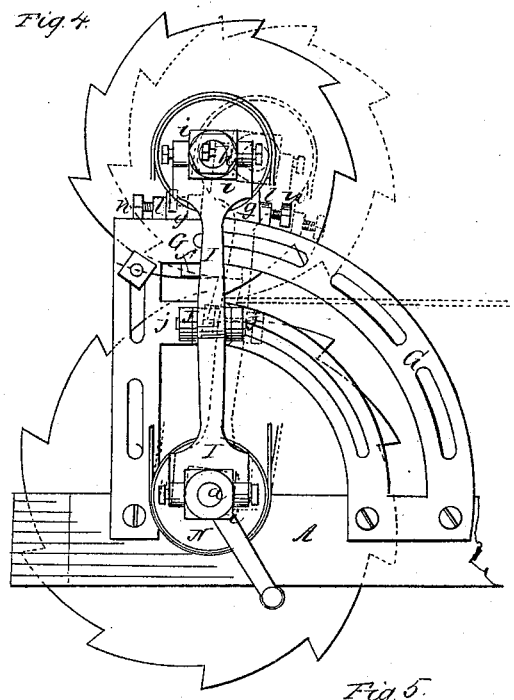
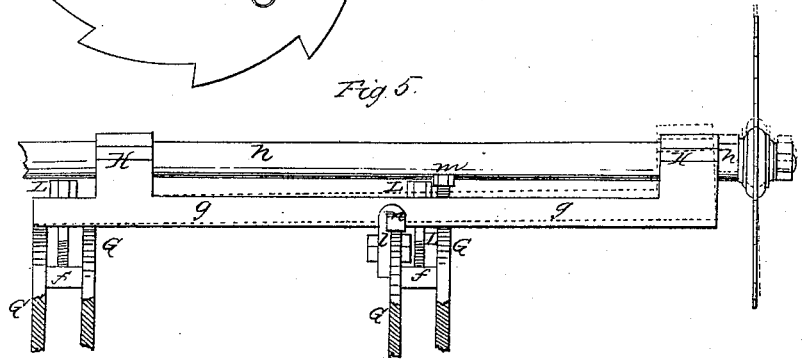

UNITED STATES PATENT OFFICE.

ANDREW L. WHITLEY, OF ST. LOUIS, MISSOURI.

METHOD OF ADJUSTING CIRCULAR SAWS.

Specification of Letters Patent No. 14,379, dated March 4, 1856.

*To all whom it may concern:*

Be it known that I, ANDREW L. WHITLEY, of St. Louis, in the State of Missouri, have invented a new and useful Improvement in the Construction of Circular-Saw Mills; and I do hereby declare that the following is a full and exact description thereof, reference being had to the accompanying drawings and to the letters of reference marked thereon.

The nature of my invention consists in so constructing the double circuler saw mill that the two saws, with their respective shafts may be perfectly and readily adjusted so that the saws will be made to run in one and a perfect plane (in which case the board sawed will have its sides perfectly true and even), or so that they will run in two distinct planes, for the purpose of sawing two boards at once, or so that their peripheries will intersect a line parallel to the line of motion of the carriage or bed which carries the log or timber.

To enable others skilled in the art to make and use my invention, I will proceed to describe its construction and operation.

I construct my framework in nearly the same form as that usually adopted, A, A, &c., representing the lower frame on which are placed the boxes or bearings B, B, of the lower saw spindle or shaft, $a$, and also the boxes $b$, $b$, and $c$, $c$, of the feed shafts C, and D, the shaft C, being driven by the belt $d$ from the pulley E, on shaft $a$. And the shaft D, by the spur gear $e$, on shaft C. The spur gear F, is intended to drive the carriage which carries the timber.

G, G, &c., are the arcs, fastened to the lower frame A, A, and on which is fastened or secured, by means of the adjustable shoes $f$, $f$, the upper frame or bar $g$, on which bar are the boxes or bearings H, H, of the upper saw spindle or shaft $h$. The two shafts $a$ and $h$, are connected at the back end by means of the swinging arm I, and its slotted boxes or swivels $i$, $i$. The arm I is hung at its center upon a pivot $j$ in the end of the stud J. The other end of stud J, is adjustable in and secured to the arc G by the nut $k$.

L, L, are two bolts passing through bar $g$, and shoes $f$, $f$, for the purpose of securing firmly the bar $g$, to the arcs G, G, when the bar is placed on such points on the arcs as it is required to be on.

$m$, $m$, are set screws for raising or lowering either end of bar $g$.

$n$, $n$, are set screws (in the dog $l$,) for adjusting the bar $g$, horizontally, in one direction or the other.

M, is the driving pulley and N, the pulley which drives the upper saw spindle on shaft.

Having defined the construction of my improved mill, I will proceed to describe its operation and advantages over those in use.

The operation of the feed work and carriage bearing the timber, is the same as in any other mill and the saw spindles are driven or rotated by the known means and in the usual way.

When the mill or saws are to be put into operation the saws are first to be perfectly adjusted so that they will run in exactly the same plane, for without this perfect adjustment, the boards which are sawed will not have their sides perfect planes, but will have a seam or shoulder through the middle (or where the cuts of the two saws run together) of each side; hence the great objection to circular saw mills, in which the saws can not be adjusted so as to saw the sides of the boards perfectly true and even.

To arrive at this perfect adjustment which is so necessary, I proceed in the following manner. In order to bring the lower portion of the teeth of the upper saw directly over the upper portion of the teeth of lower saw, I simply turn the set screws $o$, $o$, (in the ends of the fork $p$,) which causes the arm I, to turn on its pivot $j$, either end of the arm moving in a direction opposite to that of the other, and as either end of the arm I is connected by means of the slotted boxes $i$, $i$, with the end of one and the other of the shafts $a$, and $h$, the shafts $a$, and $h$, must necessarily slide in opposite directions in their boxes or bearings thus bringing the saws, on said shafts, over each other, but by this mode of adjustment the saws each move toward the other at the same rate and as they both move at the same time it is evident that it requires only half the time for their adjustment that it requires in the modes now in existence, in which one saw is moved the whole distance between it and the other, but in this particular respect my improvement only accomplishes the same end in half the time now occupied, but this single movement, or the bringing of the adjacent points of the saws the one over the other (which is the only adjustment in the present machine or constructions) does not necessarily bring the same in the same plane, for one or the other of them may not be at right angles with its shaft or axis of motion, or, the two shafts may not be exactly parallel, or other inaccuracies in the construction may exist any of which prevent the saws from running in the same plane, after the adjacent edges have been adjusted, hence it is necessary that the saw can be so adjusted that two vertical lines drawn through their center, should be found in the same plane, which adjustment I accomplish by raising or lowering one end of the bar $g$, on which are the bearings of the shaft $h$. But this is not all that is necessary, for after I have so adjusted the saws that I find two vertical lines passing through their center, in the same plane, I must then adjust them so that I will find two horizontal lines drawn through their centers, in the same plane, which adjustment I accomplish by means of the set screws $n$, $n$, in the dog Z, which screws move the bar, $g$, backward or forward in a horizontal plane.

When the saws become smaller by use, so that they do not cut through, or in other words when their peripheries do not run near enough to each other, I simply loosen the bolts L, L, which relieves the bar $g$, from the arcs G, G. I then move the bar $g$, along upon the arcs G, G, until I bring the same as near each other as desired; the nut $k$ must also be loosened to allow the stud J, to pass around its arc.

It will be seen that although the arc G is not struck from, or has not its center in the center of the shaft $a$, still the relative position of the parts, of the mechanism for adjusting and of the whole with the shafts remains unchanged when the whole is moved around on the arc ($a'$). It will also be seen that although my shafts are adjusted in all directions they are perfectly permanent when adjusted (excepting their rotary motion); which is very desirable since, if the shaft is allowed to have any end play the saw will take its own course through the log, this is very obvious, especially when the saw comes in contact with the side of a knot or hard portion; when the saws were manufactured of the same thickness at the edge as at the center or thicker on the edges, it deemed necessary to allow them the end play of the shaft, but since the improvements made in grinding saws thickest at the center and tapering off to a less thickness toward the edge and setting the saw (or teeth) so as to clear itself, it is found necessary to have the shafts stiff or without any end play, as any lateral motion of the shaft causes the saw to buckle and heat. I do not however claim any construction by which the shaft is prevented from having any lateral motion, but What I do claim as my invention and desire to secure by Letters Patent is—

1. The adjusting of the two saws at the same time toward each other by means of the swinging arm and its set screws, as herein described or in any other way substantially the same and without allowing any end play to the shaft.

2. The combination of the device above claimed with the devices L, $m$, $n$, $l$, for the purpose of adjusting the saw in every direction as herein before described.

3. So constructing the adjusting mechanism that it follows the shaft when moved around on the arcs.

AND. L. WHITLEY.

Witnesses:
CHAS. J. WOODWARD,
CHAS. N. TYLER.